United States Patent (10) Patent No.: US 8,335,941 B2
Chang et al. (45) Date of Patent: *Dec. 18, 2012

(54) METHOD FOR REDUCING POWER CONSUMPTION OF A COMPUTER SYSTEM IN THE WORKING STATE

(75) Inventors: Nai-Shung Chang, Taipei (TW); Chia-Hsing Yu, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 384 days.

This patent is subject to a terminal disclaimer.

(21) Appl. No.: 12/752,201

(22) Filed: Apr. 1, 2010

(65) Prior Publication Data

US 2010/0191988 A1 Jul. 29, 2010

Related U.S. Application Data

(63) Continuation of application No. 11/423,722, filed on Jun. 13, 2006, now Pat. No. 7,783,905.

(51) Int. Cl.
*G06F 1/04* (2006.01)
*G06F 1/12* (2006.01)
*G06F 5/06* (2006.01)

(52) U.S. Cl. ........ 713/600; 713/300; 713/320; 713/322; 713/340

(58) Field of Classification Search .......... 713/300, 713/322, 340, 320, 600
See application file for complete search history.

(56) References Cited

U.S. PATENT DOCUMENTS

| | | | |
|---|---|---|---|
| 6,647,502 B1 * | 11/2003 | Ohmori | 713/322 |
| 6,795,927 B1 | 9/2004 | Altmejd et al. | |
| 6,865,653 B2 | 3/2005 | Zaccarin et al. | |
| 6,990,598 B2 | 1/2006 | Sherburne, Jr. | |
| 7,017,053 B2 | 3/2006 | Mizuyabu et al. | |
| 7,036,032 B2 | 4/2006 | Mizuyabu et al. | |
| 7,047,430 B2 | 5/2006 | Chang | |
| 7,062,665 B2 | 6/2006 | Zhang et al. | |
| 7,085,945 B2 | 8/2006 | Silvester | |
| 7,114,086 B2 | 9/2006 | Mizuyabu et al. | |
| 7,149,911 B2 | 12/2006 | Yeh | |
| 7,167,994 B2 * | 1/2007 | Zdravkovic | 713/322 |
| 7,203,856 B2 | 4/2007 | Yeh | |
| 7,237,131 B2 | 6/2007 | Kwa | |
| 7,305,569 B2 | 12/2007 | Reilly | |
| 7,398,414 B2 | 7/2008 | Sherburne, Jr. | |
| 7,444,526 B2 * | 10/2008 | Felter et al. | 713/300 |
| 7,454,651 B2 | 11/2008 | Chen | |
| 7,472,306 B2 * | 12/2008 | Tsui et al. | 713/600 |

(Continued)

*Primary Examiner* — Jaweed A Abbaszadeh

(74) *Attorney, Agent, or Firm* — McClure, Qualey & Rodack, LLP

(57) ABSTRACT

A method for reducing power consumption of a computer system in a working state is provided. The computer system comprises a processor, a memory and a chipset, and the processor is connected with the chipset through a processor bus. The method comprises classifying the power saving level of the computer system into a predetermined number of power saving modes, checking at least one power saving mode transition condition to determine whether to automatically raise the power saving mode of the computer system, and raising the power saving mode of the computer system by lowering a first voltage supply level of the chipset and a second voltage supply level of the memory and decreasing a first working frequency of the processor bus and a second working frequency of the memory. The power consumption of the computer system is further reduced in comparison with a normal working state when the power saving mode of the computer system is further raised.

18 Claims, 10 Drawing Sheets

U.S. PATENT DOCUMENTS

| | | |
|---|---|---|
| 7,529,955 B2 * | 5/2009 | Kurts et al. .................. 713/320 |
| 7,590,876 B2 | 9/2009 | Chu et al. |
| 7,610,497 B2 | 10/2009 | Lin et al. |
| 7,669,067 B2 * | 2/2010 | Degenhardt .................. 713/322 |
| 2002/0169990 A1 | 11/2002 | Sherburne |
| 2003/0131269 A1 | 7/2003 | Mizyuabu et al. |
| 2003/0131274 A1 | 7/2003 | Mizuyabu et al. |
| 2003/0161063 A1 | 8/2003 | Izumiya et al. |
| 2004/0148528 A1 | 7/2004 | Silvester |
| 2004/0168095 A1 | 8/2004 | Yeh |
| 2004/0168096 A1 | 8/2004 | Yeh |
| 2004/0187045 A1 | 9/2004 | Butcher |
| 2005/0149768 A1 | 7/2005 | Kwa |
| 2005/0289366 A1 | 12/2005 | Reilly |
| 2006/0064999 A1 | 3/2006 | Hermerding et al. |
| 2006/0080566 A1 | 4/2006 | Sherburne |
| 2006/0123257 A1 | 6/2006 | Silvester |
| 2006/0174142 A1 | 8/2006 | Lin et al. |
| 2006/0174151 A1 | 8/2006 | Lin et al. |
| 2007/0005997 A1 | 1/2007 | Kardach et al. |
| 2007/0157042 A1 | 7/2007 | Jahagirdar et al. |

* cited by examiner

| Power Saving Mode | PSM 0 | PSM 1 | PSM 2 | PSM 3 |
|---|---|---|---|---|
| Chipset core voltage ($V_{DD}$) | 1.5V | 1.3V | 1.2V | 1.0V |
| Memory voltage ($V_{DDQ}$ / $V_{TT}$) | 1.8V/0.9V | 1.75V/0.875V | 1.75V/0.875V | 1.70V/0.85V |
| Processor bus frequency | 200MHz | 166MHz | 133MHz | 100MHz |
| Memory frequency | 333MHz | 266MHz | 266MHz | 200MHz |
| PSMPWR[1:0]# | 11 | 10 | 01 | 00 |
| PSMPWR[3:2]# | 11 | 10 | 01 | 00 |
| PSMFREQ[1:0]# | 11 | 10 | 01 | 00 |
| Note | Normal power consumption | Lower power consumption | Lower power consumption | Lowest power consumption |

FIG. 3

METHOD FOR REDUCING POWER CONSUMPTION OF A COMPUTER SYSTEM IN THE WORKING STATE

CROSS REFERENCE TO RELATED APPLICATIONS

This application is a Continuation of U.S. patent application Ser. No. 11/423,722, filed on Jun. 13, 2006, now U.S. Pat. No. 7,783,905, the entirety of which is incorporated by reference herein.

BACKGROUND OF THE INVENTION

1. Field of the Invention

The invention relates to a computer system, and more particularly to reducing the power consumption of a computer system.

2. Description of the Related Art

Power management is an important issue for computer systems. If the amount of power available to a computer system is limited, such as in a battery for a notebook or a handheld computer, reducing the power consumption of the computer can extend the amount of time the computer can be used when operating on battery power. Even if the computer is a desktop computer, more efficient operation can reduce power consumption. For example, when the computer is used for word processing, the utility rate of the processor of the computer may be only 10%, and 90% of the power of the processor is wasted.

FIG. 1 shows the state transition of a computer system conforming to the advanced configuration and power interface (ACPI) conceived by Intel and Microsoft. A computer is designed to operate under four different states. When the computer is in the G0 work state, it operates normally. If the computer is idle for a predetermined period of time, the computer enters the G1 sleep state witch has a reduced power level. In the G1 sleep state, some system context, such as the CPU context and the chipset context, is lost to reduce power consumption. When a key is pressed, or the mouse is moved, the computer system awakes from the G1 sleep state and enters the G0 work state, and the system context is restored.

Computer systems conforming to ACPI, however, only enter the G1 sleep state when idle. The ACPI cannot reduce the power consumption while the computer is working. Additionally, an ordinary computer system operates at a fixed working frequency and under a single operating voltage. If the computer system dynamically decreases the working frequency and lowers the operating voltage according to system behavior or system application, the power consumption of the computer system is reduced even though the computer is working.

BRIEF SUMMARY OF THE INVENTION

A method for reducing power consumption of a computer system in a working state is provided. The computer system comprises a processor, a memory and a chipset, and the processor is connected with the chipset through a processor bus. The method comprises classifying the power consumption level of the computer system into a predetermined number of power saving modes, checking at least one power saving mode transition condition to determine whether to automatically raise the power saving mode of the computer system, and raising the power saving mode of the computer system by lowering a first voltage supply level of the chipset and a second voltage supply level of the memory and decreasing a first working frequency of the processor bus and a second working frequency of the memory. The power consumption of the computer system is further reduced in comparison with a normal working state when the power saving mode of the computer system is further raised.

A method for reducing power consumption of a computer system in a working state is provided. The computer system comprises a processor, a memory and a chipset, and the processor is connected with the chipset through a processor bus. The power consumption level of the computer system is classified into a predetermined number of power saving modes. The method comprises enabling a power saving mode controller of the chipset to control the power saving modes of the computer system, checking at least one power saving mode transition condition to determine whether to raise the power saving mode of the computer system, asserting a BPRI# or a BNR# pin of the chipset to signal the processor that the chipset will control the processor bus, lowering a first voltage supply level of the chipset and a second voltage supply level of the memory if the power saving mode is raised, decreasing a first working frequency of the processor bus and a second working frequency of the memory if the power saving mode is raised, and de-asserting the BPRI# or the BNR# pin of the chipset after the first and second working frequencies is increased. The power consumption of the computer system is further reduced in comparison with a normal working state of the computer system when the power saving mode of the computer system is further raised.

A chipset capable of reducing power consumption of a computer system in a working state is also provided. The computer system comprises a processor, a memory and a chipset, and the processor is connected with the chipset through a processor bus. The power saving level of the computer system is classified into a predetermined number of power saving modes. The chipset comprises at least one first power control pin coupled between the chipset and a chipset voltage regulator which supplies a first voltage of the chipset, at least one second power control pin coupled between the chipset and a memory power regulator which supplies a second voltage of the memory, at least one frequency control pin coupled between the chipset and a system clock synthesizer, and a power saving mode controller coupled to the at least one first and second power control pins and the frequency control pin.

The power saving mode controller checks at least one power saving mode transition condition to determine whether to raise the power saving mode of the computer system, signals the chipset voltage regulator to lower the level of the first voltage via the at least one first power control pin if the power saving mode is raised, signals the memory power regulator to lower the level of the second voltage via the at least one second power control pin if the power saving mode is raised, and signals the system clock synthesizer to decrease a first working frequency of the processor bus and a second working frequency of the memory through the at least one frequency control pin if the power saving mode is raised. The power consumption of the computer system is further reduced in comparison with a normal working state of the computer system when the power saving mode of the computer system is further raised.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 3 shows a table listing the voltage supply level and the working frequency of different power saving modes;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
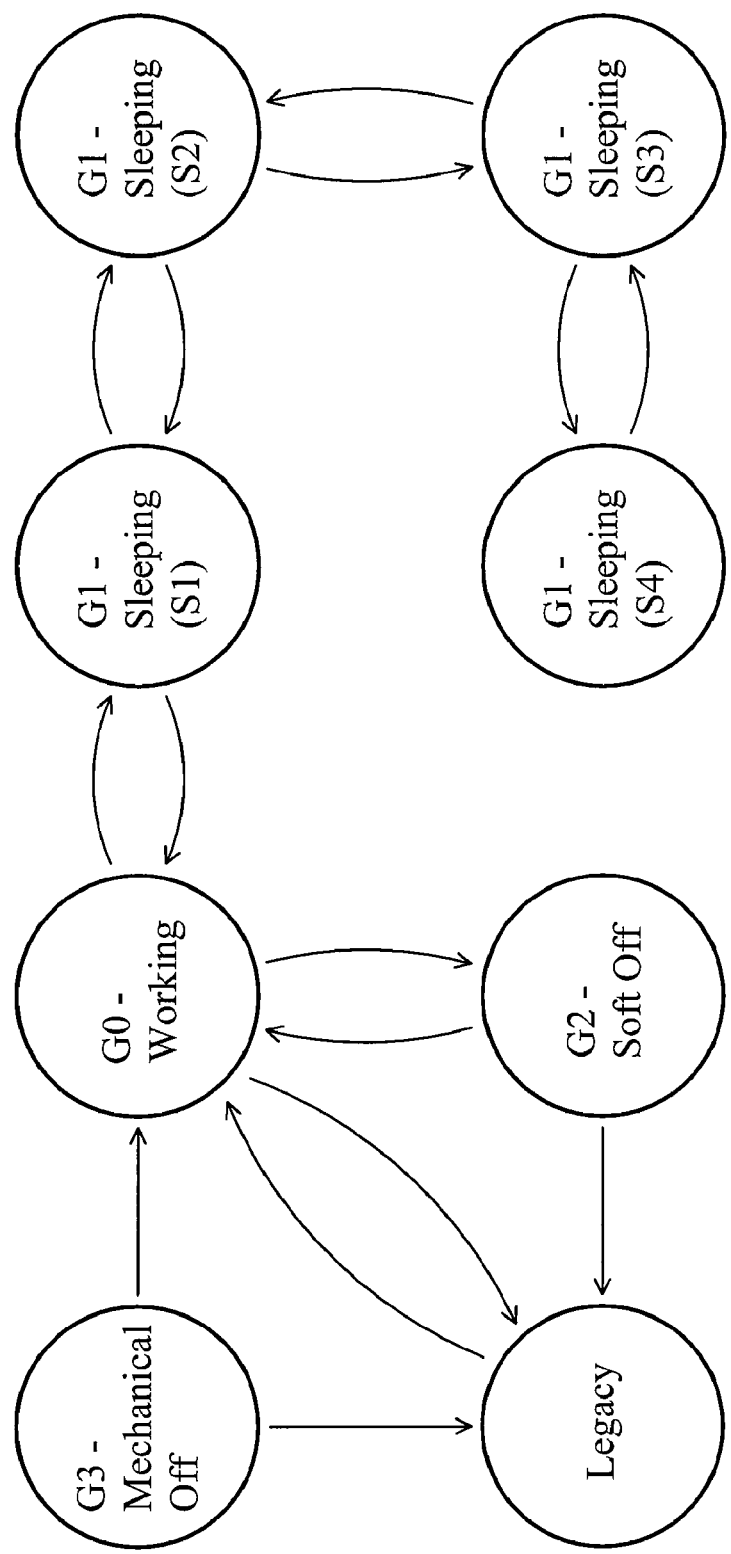
FIG. 1 shows the state transition of a computer system conforming to the advanced configuration and power interface (ACPI) conceived by Intel and Microsoft.
Figure 2:
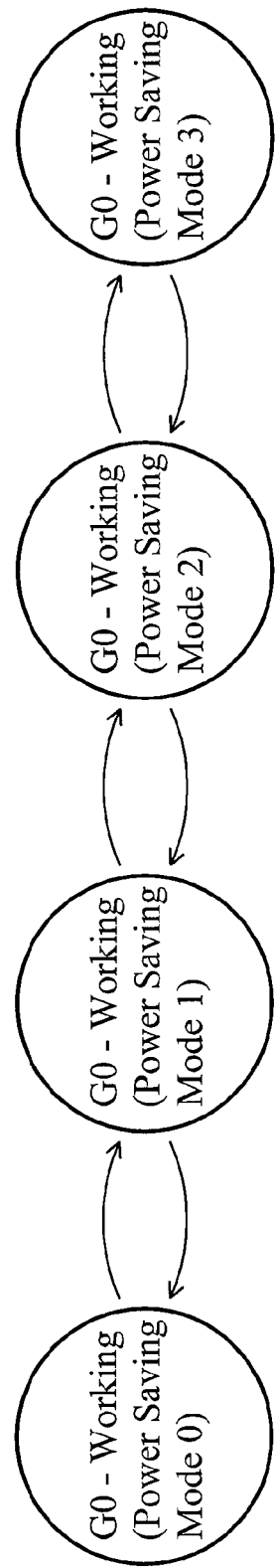
FIG. 2 shows the state transition of four power saving modes with different power consumption levels according to the invention.

FIG. 2 shows the state transition of four power saving modes with different power saving levels according to the invention. The power saving level of a computer system is classified into a predetermined number of power saving modes. There are four power saving modes in FIG. 2, but the number of power saving modes can vary according to the requirements. When a computer is operating normally in the ACPI G0 working state, it enters the power saving mode 0 of the invention. No extra power of the computer system is saved under the power saving mode 0. If the power saving mode of the computer system is raised from 0 to 1, the power consumption of the computer system is reduced. Similarly, the power consumption of power saving mode N+1 is further reduced in comparison with that of power saving mode N. In FIG. 2, if the power saving mode of the computer is changed from PSM 0 to PSM 2, the computer must sequentially enter PSM 1 and then enter PSM 2. The power saving mode can be directly changed from the current power saving mode to the desired power saving mode in other embodiments, however. All power saving modes operate under the G0 working state of the computer.

Each of the power saving modes of the computer system has a different voltage supply level and working frequency setting. The power saving mode of the computer system can be set manually through a software application. In other embodiments, the computer checks a few power saving mode transition conditions to determine whether to automatically change the power saving mode of the computer system. If the power saving mode of the computer system is raised, the voltage supply level of the computer system is lowered to reduce power consumption, and the working frequency of the computer system is also decreased to reduce power consumption. If the power saving mode of the computer system is lowered, the voltage supply level of the computer system is raised, and the working frequency of the computer system is also increased to return to an original power consumption level.

FIG. 3 shows a table 300 listing the voltage supply level and the working frequency of different power saving modes. Each column of table 300 corresponds to one of the four power saving modes of FIG. 2. The computer system comprises a processor, a memory and a chipset. The processor is connected with the chipset through a processor bus. The first row of table 300 shows the voltage supply level ($V_{DD}$) of the chipset. The voltage supply level of the chipset is 1.5 V in PSM 0, and it is lowered to 1.0 V in PSM 3. The second row of table 300 shows the voltage supply level of the memory, including an input-output voltage ($V_{DDQ}$) and a termination voltage ($V_{TT}$). The input-output voltage level of the memory is 1.8 V in PSM 0, and it is lowered to 1.70 V in PSM 3. The termination voltage level of the memory is 0.9 V in PSM 0, and it is lowered to 0.85 V in PSM 3. The third row of table 300 shows the working frequency of the processor bus. The working frequency of the processor bus is 200 MHz in PSM 0, and it is decreased to 100 MHz in PSM 3. The fourth row of table 300 shows the working frequency of the memory. The working frequency of the memory is 333 MHz in PSM 0, and it is decreased to 200 MHz in PSM 3.

Figure 4:
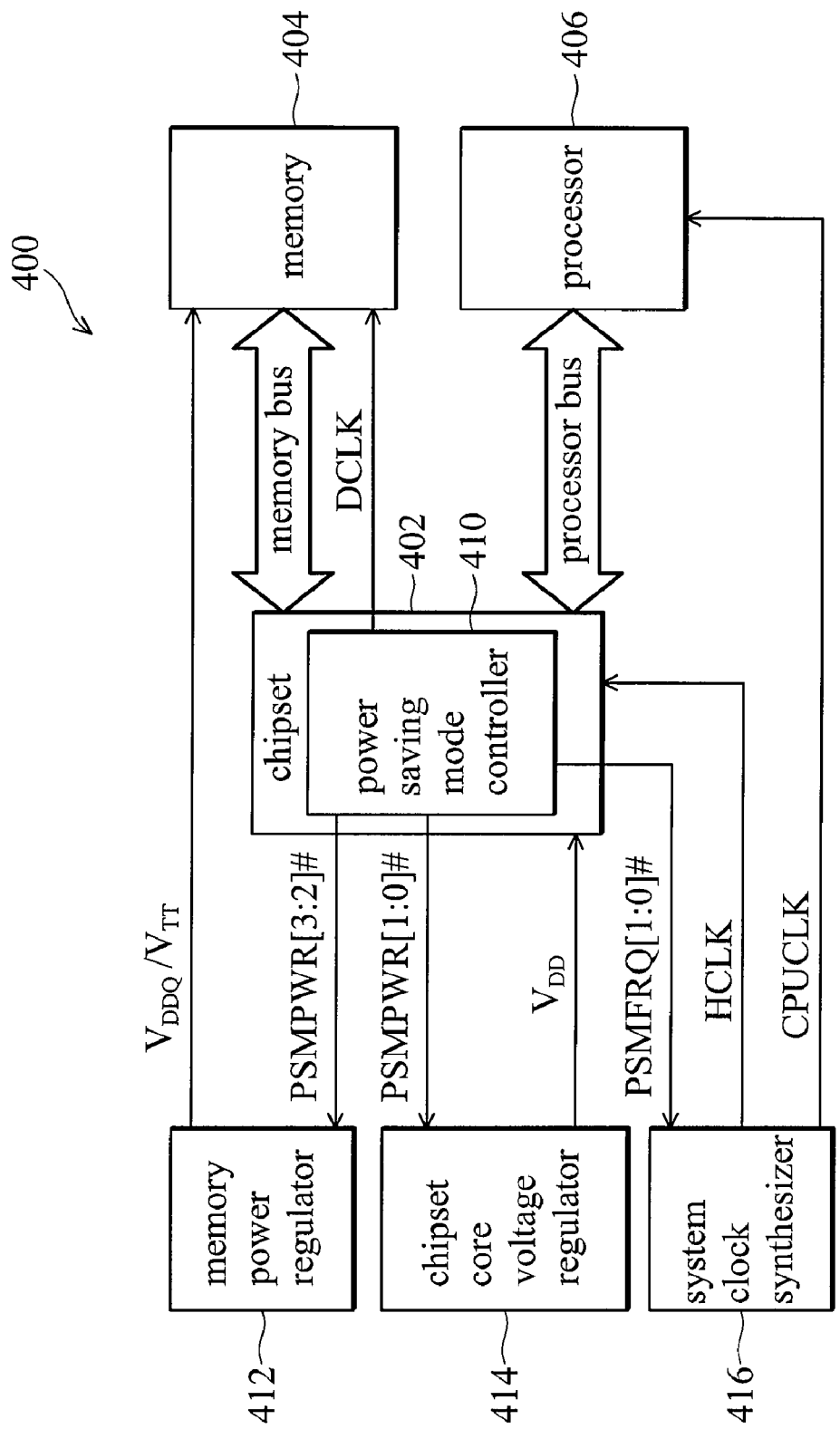
FIG. 4 shows a block diagram of a computer system implementing power saving modes according to the invention.

FIG. 4 shows a block diagram of a computer system 400 implementing power saving modes according to the invention. The computer system 400 includes a chipset 402, a memory 404, and a processor 406. The processor 406 is connected with the chipset 402 through a processor bus, and the memory 404 is connected with the chipset 402 through a memory bus. The computer system 400 also includes a chipset voltage regulator 414 which supplies a voltage $V_{DD}$ of the chipset, a memory power regulator 412 which supplies the voltages $V_{DDQ}$ and $V_{TT}$ of the memory, and a system clock synthesizer 416 which provides the clock signal of the computer system. The chipset 402 includes two first power control pins PSMPWR[1:0]# coupled to the chipset voltage regulator 414, two second power control pins PSMPWR[3:2]# coupled to the memory power regulator 412, and two frequency control pins PSMFREQ[1:0]# coupled to the system clock synthesizer 416.

The chipset 402 also includes a power saving mode controller 410 which controls the power saving modes of the computer system 400. The power saving mode controller 410 checks a few power saving mode transition conditions to determine whether to automatically raise the power saving mode of the computer system. A user of the computer system 400 can also manually set the desirable power saving mode through a software application, which adjusts the setting stored in the registers of the power saving mode controller 410. If the power saving mode is determined to be raised, the power saving mode controller 410 signals the chipset voltage regulator 414 to lower the level of the voltage $V_{DD}$ via the first power control pins PSMPWR[1:0]#, and signals the memory power regulator 412 to lower the level of the voltages $V_{DDQ}$ and $V_{TT}$ via the second power control pins PSMPWR[3:2]#. Thus, the voltage $V_{DD}$ of the chipset 402 and the voltages $V_{DDQ}$ and $V_{TT}$ of the memory 404 is lowered according to the values of table 300. The power saving mode controller 410 also signals the system clock synthesizer 416 to decrease the frequency of clock signal HCLK of the chipset 402, the working frequency of the processor bus, the frequency of the clock signal DCLK of the memory 404, and the frequency of the clock signal CPUCLK of the processor 406 through the frequency control pins PSMFREQ[1:0]#. Thus, the working frequency of the processor bus and the memory 404 are decreased according to the values of table 300 if the power saving mode of computer system 400 is raised.

Figure 5:
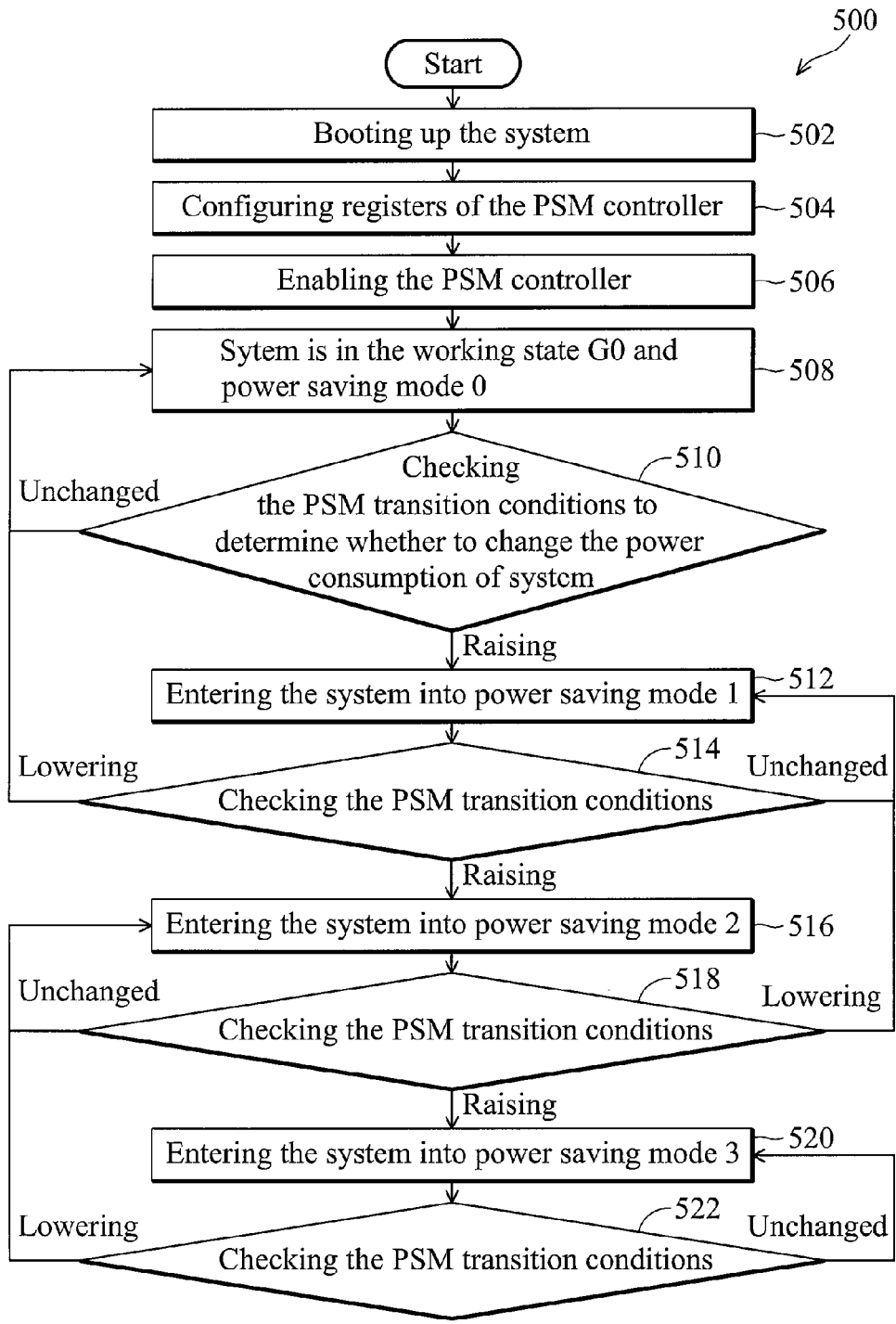
FIG. 5 shows a method for implementing the power saving modes to reduce power consumption of the computer system according to the invention.

FIG. 5 shows a method 500 for implementing the power saving modes to reduce power consumption of the computer system 400 according to the invention. The computer system 400 is booted up in step 502. The registers of the power saving mode controller 410 are configured in step 504. The registers store a few predefined values for setting the power saving mode controller 410. The power saving mode controller 410 is then enabled in step 506. The computer system 400 then enters the G0 working state and power saving mode 0 in step 508. The power saving mode controller 410 then checks a few power saving mode transition conditions to determine whether to raise the power saving mode of the computer system in step 510. The power saving mode transition conditions will be further illustrated in FIGS. 6, 7, and 8. If the power saving mode of the computer system is determined to be raised, the power saving mode controller 410 enters the computer system 400 into the power saving mode 1 in step 512.

The power saving mode controller 410 repeatedly checks the power saving mode transition conditions at a predetermined interval to determine whether to raise or lower the power saving mode of the computer system, such as in steps 514, 518, and 522. The current power saving mode of the computer system may be raised, lowered or unchanged according to the power saving mode transition conditions. If the power saving mode is determined to be unchanged, the current power saving mode remains. If the power saving mode is determined to be raised, the power saving mode controller 410 signals the chipset voltage regulator 414 and the memory power regulator 412 to lower the level of the voltages $V_{DD}$, $V_{DDQ}$ and $V_{TT}$, and signals the system clock synthesizer 416 to decrease the working frequency of chipset 402, memory 404, processor 406 and the processor bus, such as the power saving mode is raised from PSM 1 of step 514 to PSM 2 of step 516, or from PSM 2 of step 518 to PSM 3 of step 520. If the power saving mode is determined to be lowered, the power saving mode controller 410 signals the chipset voltage regulator 414 and the memory power regulator 412 to raise the level of the voltages $V_{DD}$, $V_{DDQ}$ and $V_{TT}$, and signals the system clock synthesizer 416 to increase the working frequency of chipset 402, memory 404, processor 406 and the processor bus, such as the power saving mode is lowered from PSM 3 of step 522 to PSM 2 of step 516, or from PSM 2 of step 518 to PSM 1 of step 512. The details of the process for raising or lowering the power saving mode of the computer system will be respectively illustrated in FIGS. 9a and 9b.

Figure 6:
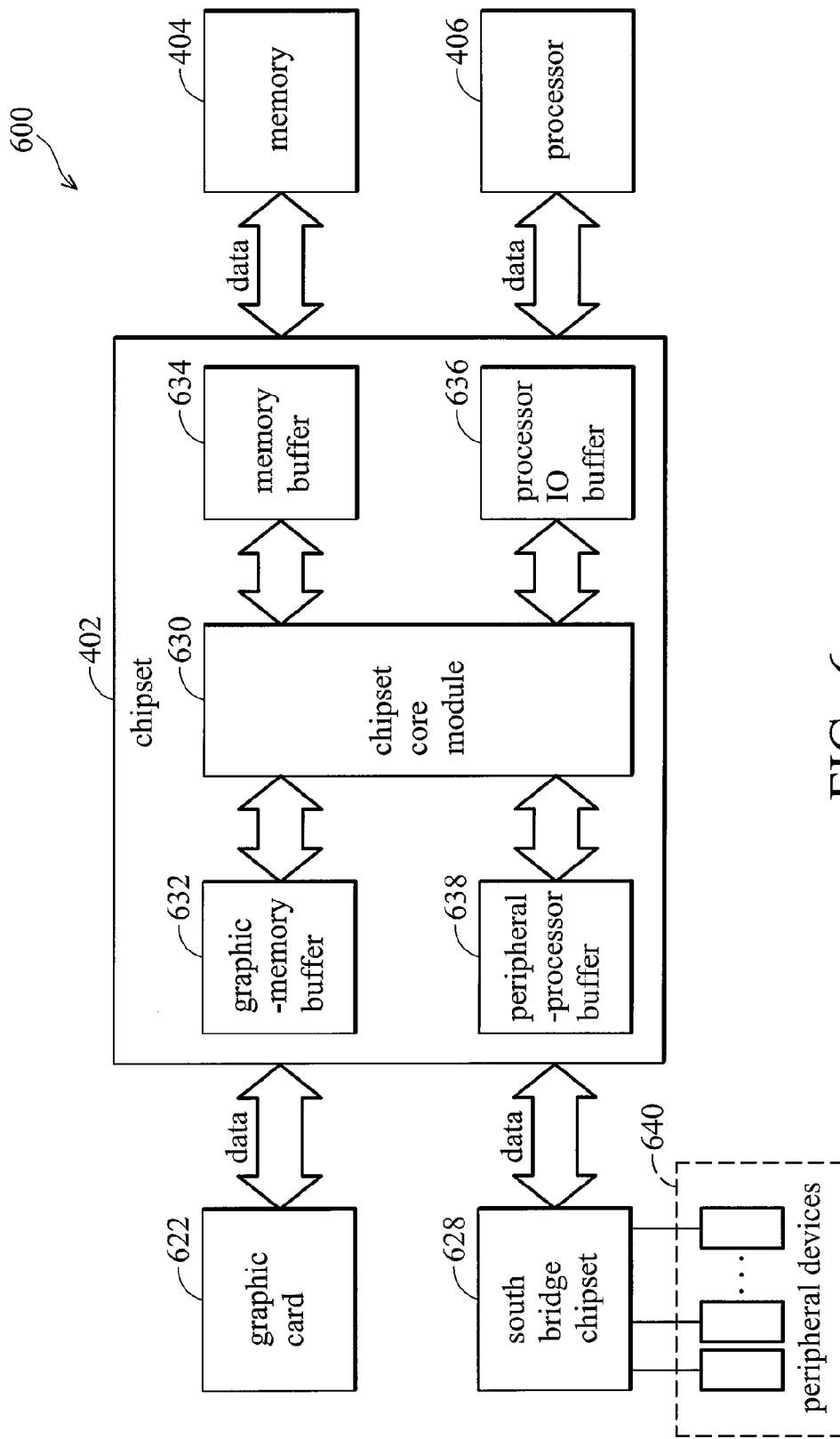
FIG. 6 shows a computer system automatically checking the power saving mode transition conditions according to the invention.

FIG. 6 shows a computer system 600 automatically checking the power saving mode transition conditions according to the invention. The computer system 600 includes the chipset 402, the memory 404, the processor 406, a graphic card 622, a south bridge chipset 628, and a few peripheral devices 640. The south bridge chipset 628 buffers data exchanged between the peripheral devices 640 and the processor 406. The chipset 402 includes a chipset core module 630 and the power saving mode controller 410 of FIG. 4. The chipset also includes a peripheral-processor buffer 638, a processor IO buffer 636, a graphic-memory buffer 632 and a memory buffer 634. The data exchanged between the south-bridge chipset 628 and the chipset 402 is buffered by the peripheral-processor buffer 638. The data exchanged between the processor 406 and the chipset 402 is buffered by the processor input-output buffer 636. The data exchanged between the graphic card 622 and the chipset 402 is buffered by the graphic-memory buffer 632, and the data exchanged between the memory 404 and the chipset 402 is buffered by the memory buffer 634. Because the fill levels of the buffers reflect the amount of activity of the computer system, the power saving mode controller 410 can periodically detect the fill levels of the processor input-output buffer 636, the memory buffer 634, the graphic-memory buffer 632 and the peripheral-processor buffer 638 to determine whether to change the power saving mode of the computer system. Thus, the combined fill level of the buffers comprises the power saving mode transition conditions for determining whether to change the power saving mode.

Figure 7:
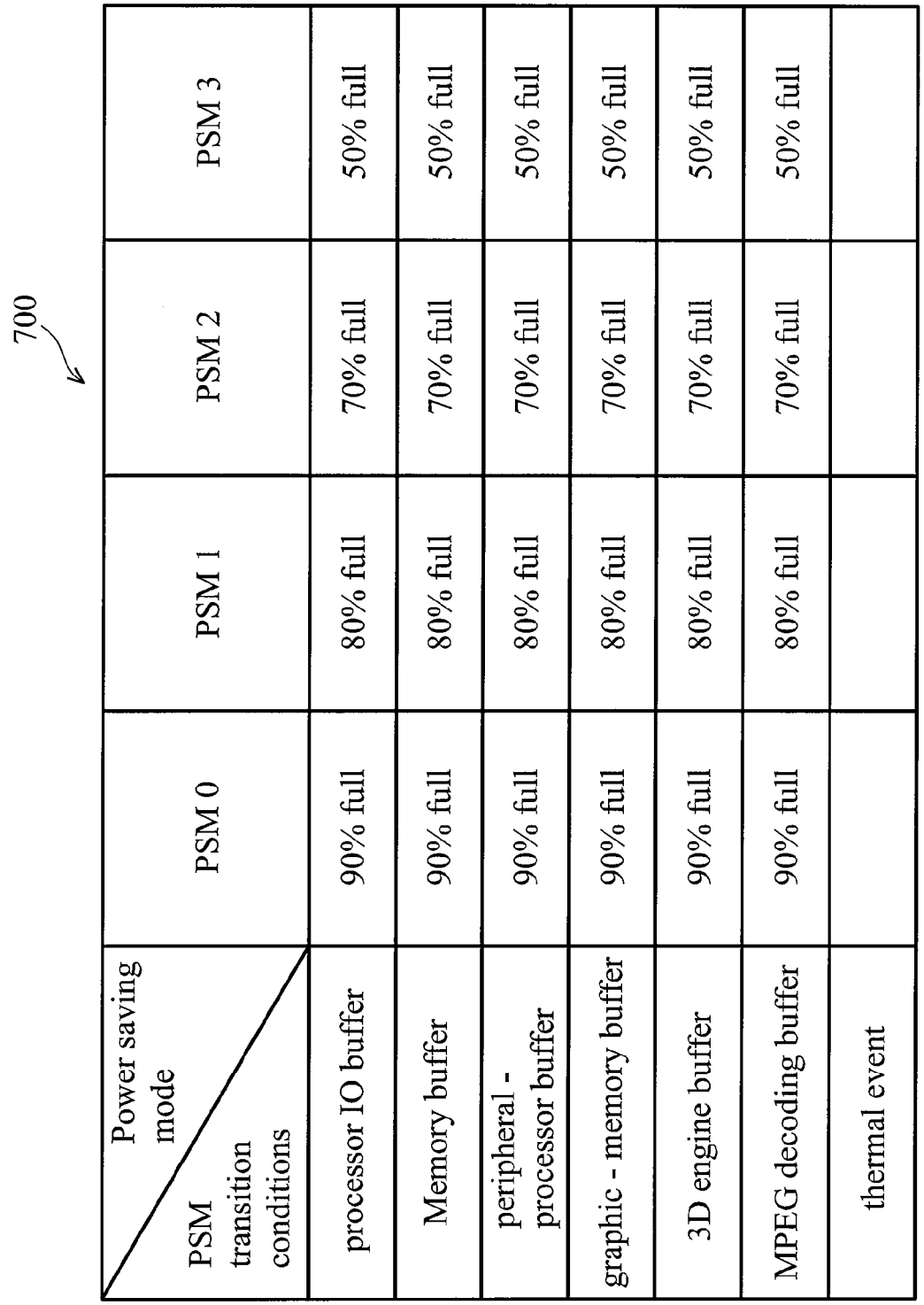
FIG. 7 shows a table listing the power saving mode transition conditions according to the invention.

FIG. 7 shows a table 700 listing the power saving mode transition conditions according to the invention. The four columns of table 700 respectively correspond to the four power saving modes. Each row of table 700 corresponds to one of the power saving mode transition conditions. The former four power saving mode transition conditions are the fill levels of the processor input-output buffer 636, the memory buffer 634, the peripheral-processor buffer 638 and the graphic-memory buffer 632. The fifth row of table 700 shows the fill level of a 3D engine buffer of the chipset 402, and the 3D engine buffer buffers data exchanged between a 3D engine of the processor. The sixth row of table 700 shows the fill level of an MPEG decoding buffer of the chipset 402, buffering data exchanged between the MPEG decoding engine of the processor and the chipset 402. The last row of table 700 shows a thermal event which may be a temperature level of the processor 406 or the chipset 402. For example, if the power saving mode controller 410 finds that some of the buffers are only 50% full, the desirable power saving mode of the computer system should be PSM 3, and if the current power saving mode is not PSM 3, the power saving mode is automatically raised. The seven power saving mode transition conditions listed in table 700 and the values in table 700 are only illustrated for example. The designer can set different power saving mode transition conditions according to system requests.

Figure 8:
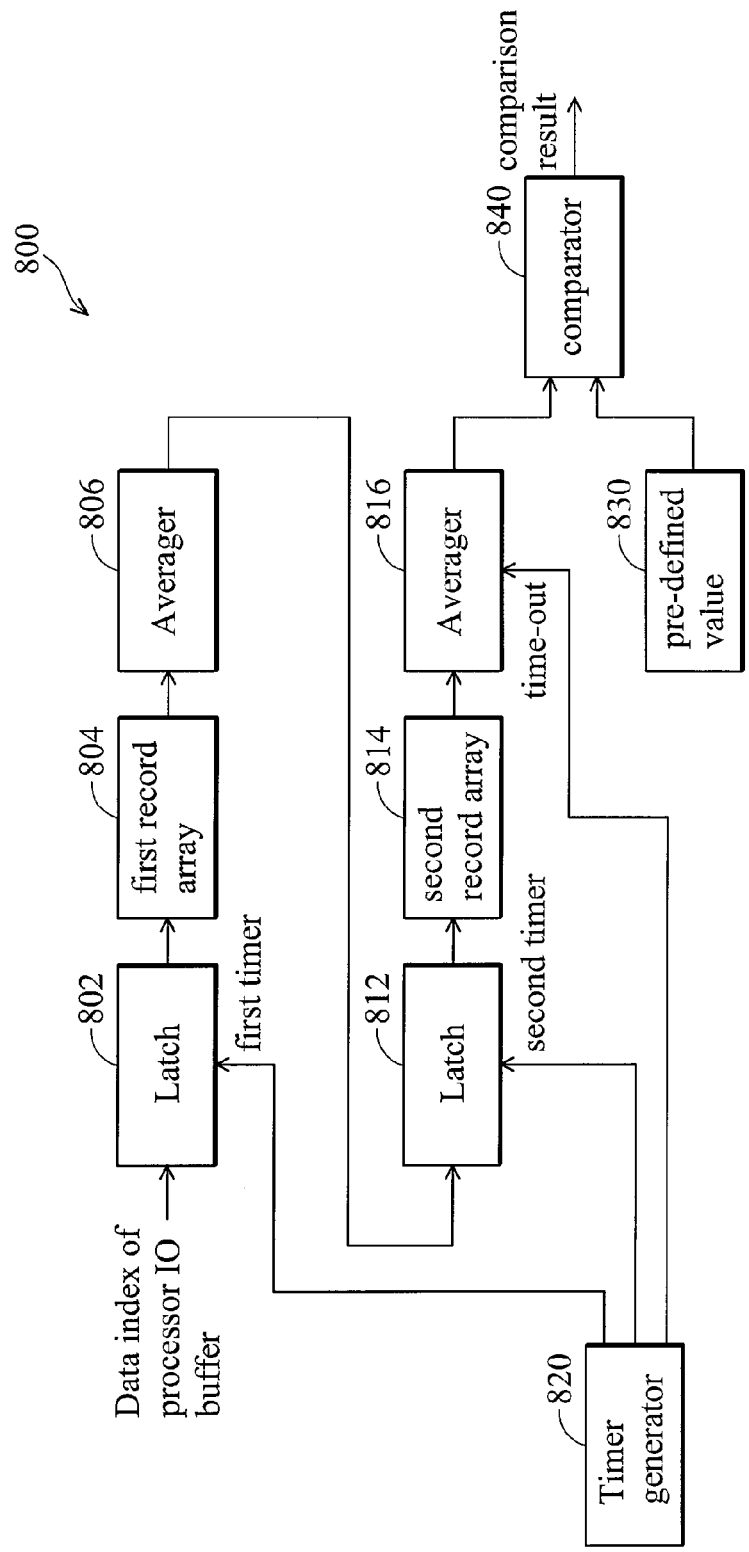
FIG. 8 shows a detection circuit for detecting the fill level of the processor IO buffer according to the invention.

FIG. 8 shows a detection circuit 800 for the power saving mode controller 410 to detect the fill level of the processor IO buffer 636. The detection circuit can also be used to detect the fill level of the other buffers of FIG. 6 or FIG. 7. The data index of the processor IO buffer 636 is delivered to the latch 802. Every time the latch 802 is triggered by a first timer sent from the timer generator 820, the latch 802 holds the current data index, and every data index held by the latch 802 is then recorded in the first record array 804. The data indexes recorded in the first record array 804 are then averaged by an averager 806 to generate a mean data index of the processor IO buffer 636. The mean data index is further delivered to the latch 812. Every time the latch 812 is triggered by a second timer sent from the timer generator 820, the latch 812 holds current mean data index, and every mean data index held by the latch 812 is then recorded in the second record array 814. When the averager 816 is triggered by a timeout sent from the timer generator 820, the mean data indexes recorded in the second record array 814 are averaged by an averager 816 to generate a mean fill level of the processor IO buffer 636. A register 830 stores some predefined values appearing in the first row of table 700. Thus, a comparator can compare the mean fill level of the processor IO buffer 636 with the values stored in the register 830 to determine the desirable power saving mode of the computer system.

Figure 9A:
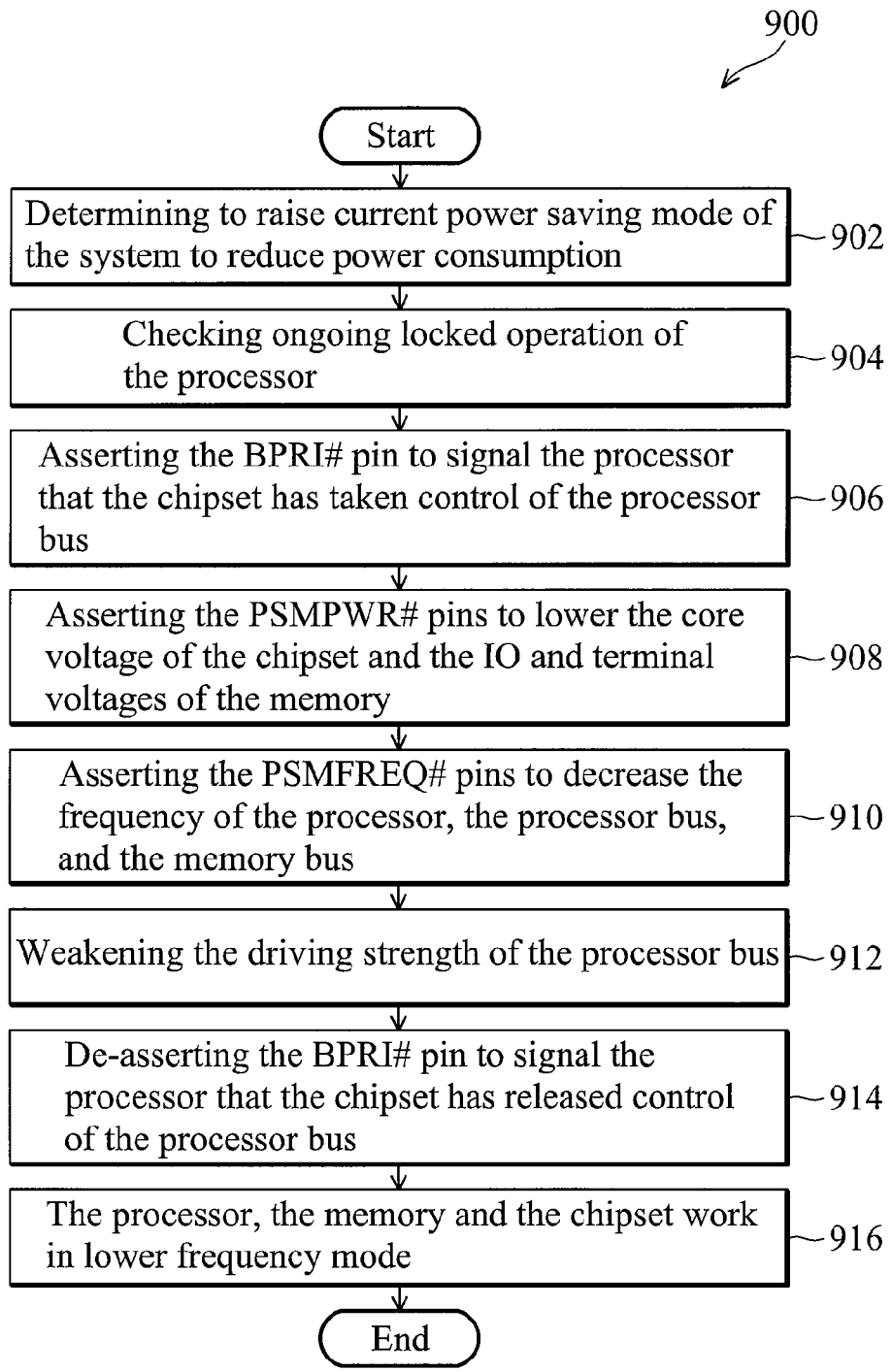
FIG. 9a shows a method for raising the power saving mode of a computer system according to the invention.

FIG. 9a shows a method 900 for raising the power saving mode of a computer system according to the invention. The power saving mode controller 410 first determines to raise the current power saving mode of the computer system to reduce power consumption in step 912. Because some ongoing locked operation of the processor 406 may be proceeding, the power saving mode controller 410 must wait until end of the locked operations in step 904. The power saving mode controller 410 then asserts a BPRI# pin of the chipset 402 in step 906 to signal the processor 406 that the chipset 402 will take control of the processor bus. The power saving mode controller 410 then asserts the PSMPWR# pins of chipset 402 to lower the voltage $V_{DD}$ of the chipset 402 and the voltages $V_{DDQ}$ and $V_{TT}$ of the memory 404 in step 908. The power saving mode controller 410 then asserts the PSMFREQ# pins of chip set 402 to decrease the working frequency of the processor 406, the processor bus, and the memory 404 in step 910. The power saving mode controller 410 also weakens the driving strength of the processor bus in step 912. The BPRI# pin is then de-asserted to signal the processor 406 that the chipset 402 has released control of the processor bus in step 914. Thus, the processor 406, the memory 404 and the chipset 402 operate at lower voltage and frequency in step 916. The BPRI# pin of step 906 and 914 can be substituted by a BNR# pin of the chipset.

Figure 9B:
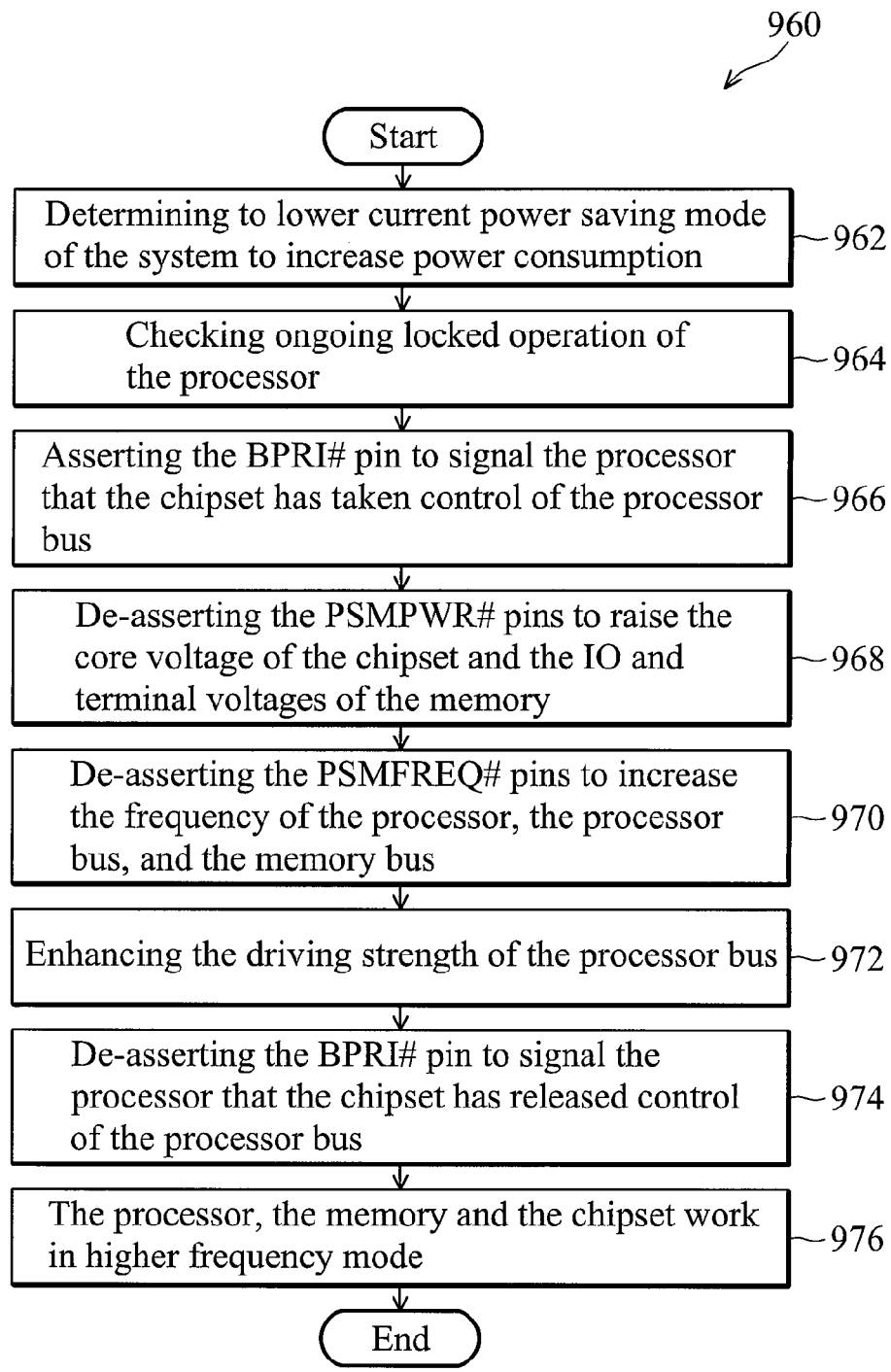
FIG. 9b shows a method for lowering the power saving mode of a computer system according to the invention.

FIG. 9b shows a method 960 for lowering the power saving mode of a computer system according to the invention. The power saving mode controller 410 first determines to lower current power saving mode of the computer system to increase power consumption in step 962. Because some ongoing locked operation of the processor 406 may be proceeding, the power saving mode controller 410 must wait until the end of the locked operations in step 964. The power saving mode controller 410 then asserts a BPRI# pin of the chipset 402 in step 966 to signal the processor 406 that the chipset 402 will take control of the processor bus. The power saving mode controller 410 then de-asserts the PSMPWR# pins of chipset 402 to raise the voltage $V_{DD}$ of the chipset 402 and the voltages $V_{DDQ}$ and $V_{TT}$ of the memory 404 in step 968. The power saving mode controller 410 then de-asserts the PSMFREQ# pins of chip set 402 to increase the working frequency of the processor 406, the processor bus, and the memory 404 in step 970. The power saving mode controller 410 also enhances the driving strength of the processor bus in step 972. The BPRI# pin is then de-asserted to signal the processor 406 that the chipset 402 has released control of the processor bus in step 974. Thus, the processor 406, the memory 404 and the chipset 402 operate at higher voltage and frequency in step 976. The BPRI# pin of step 966 and 914 can be substituted by a BNR# pin of the chipset.

The invention provides a method for reducing power consumption of a computer system in a working state. The chipset can automatically detect the busy level of the computer system to determine the desirable power saving level. By dynamically decreasing the working frequency of the computer system and lowering the voltage level of the computer system, the power consumption of the computer system is reduced even if the computer is working.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of power management for a computer system, wherein the computer system comprises a circuit coupled between a processor and a memory, the method comprising:
   providing a plurality of working modes under a working state, wherein each of the working modes individually corresponds to an operating parameter set;
   monitoring data volume of a buffer to determine whether to switch the computer system into one of the working modes; and
   changing value of the operating parameter set correspondingly while the computer system is switched into one of the working modes, wherein each of the operating parameter sets has individual values of a circuit voltage supplied to the circuit, a memory voltage supplied to the memory, a processor frequency for operating the processor, and a memory frequency for operating the memory.

2. The method of claim 1, further comprising providing a plurality of pins for controlling value of the operating parameter set, wherein one of the pins is connected to a circuit voltage regulator for controlling value of the circuit voltage; one of the pins is connected to a memory power regulator for controlling value of the memory voltage; and one of the pins is connected to a system clock synthesizer for controlling values of the memory frequency and the processor frequency.

3. The method of claim 1, wherein the buffer stores data exchanged either between the processor and the circuit, or between the memory and the circuit, or between a graphic module and the circuit, or between a south-bridge and the circuit.

4. The method of claim 1, wherein each of the working modes corresponds to an individual data volume level, wherein the computer system is switched into one of the working mode according to the data volume level.

5. The method of claim 1, wherein the method further comprises asserting a BPRI# signal while changing value of the operating parameter set, and de-asserting the BPRI# after the change.

6. A circuit capable of power management for a computer system, wherein the circuit is coupled between a processor and a memory, the circuit comprising:
   a register, storing a plurality of working modes, wherein each of the working modes individually corresponds to an operating parameter set; and
   a controller, monitoring data volume of a buffer of the computer system to determine whether to switch the computer system into one of the working modes, and changing values of the operating parameter set correspondingly while the computer system is switched into one of the working modes, wherein each of the operating parameter sets has individual values of a circuit voltage supplied to the circuit, a memory voltage supplied to the memory, a memory frequency for operating the memory, and a processor frequency for operating the processor.

7. The circuit of claim 6, wherein the circuit further comprises a plurality of pins for controlling value of the operating parameter set, wherein one of the pins is connected to a circuit voltage regulator for controlling value of the circuit voltage; one of the pins is connected to a memory power regulator for controlling value of the memory voltage; and one of the pins is connected to a system clock synthesizer for controlling values of the memory frequency and the processor frequency.

8. The circuit of claim 6, wherein the circuit further comprises the buffer for buffering data.

9. The circuit of claim 8, wherein the buffer stores data exchanged either between the processor and the circuit, or between the memory and the circuit, or between a graphic module and the circuit, or between a south-bridge and the circuit.

10. The circuit of claim 6, wherein each of the working modes corresponds to an individual data volume level, the controller monitors the data volume level of the buffer and accordingly switches the computer system into one of the working modes.

11. The circuit of claim 6, wherein the controller further asserts a BPRI# signal while changing value of the operating parameter set, and de-asserts the BPRI# after the change.

12. A computer system, coupled to a memory, the computer system comprising:
a processor; and
a circuit, coupled between the processor and the memory, wherein the computer system is provided a plurality of working modes under the working state, and each of the working modes individually corresponds to an operating parameter set; and
wherein the circuit monitors data volume of a buffer of the computer system to determine whether to switch the computer system into one of the working modes, changes value of the operating parameter set correspondingly while the computer system is switched into one of the working modes, asserts a BPRI# signal while changing value of the operating parameter set, and de-asserts the BPRI# after the change.

13. The computer system of claim 12, wherein the operating parameter set comprises any combination of the following: a circuit voltage supplied to the circuit, a memory voltage supplied to the memory, a memory frequency for operating the memory, and a processor frequency for operating the processor.

14. The computer system of claim 13, wherein the circuit further comprises a plurality of pins for controlling value of the operating parameter set, wherein one of the pins is connected to a circuit voltage regulator for controlling value of the circuit voltage; one of the pins is connected to a memory power regulator for controlling value of the memory voltage; and one of the pins is connected to a system clock synthesizer for controlling values of the memory frequency and the processor frequency.

15. The computer system of claim 12, wherein the circuit further comprises the buffer for buffering data.

16. The computer system of claim 15, wherein the buffer stores data exchanged either between the processor and the circuit, or between the memory and the circuit, or between a graphic module and the circuit, or between a south-bridge and the circuit.

17. The computer system of claim 12, wherein each of the working modes corresponds to an individual data volume level, the circuit monitors the data volume level of the buffer and accordingly switches the computer system into one of the working modes.

18. The computer system of claim 12, wherein the computer system further comprises a register for storing the plurality of working modes and the corresponding operating parameter set.

* * * * *